United States Patent
Kim et al.

(10) Patent No.: US 6,915,205 B2
(45) Date of Patent: Jul. 5, 2005

(54) APPARATUS FOR DETECTING LOCATION OF MOVABLE BODY IN NAVIGATION SYSTEM AND METHOD THEREOF

(75) Inventors: Jin-Won Kim, Seoul (KR); Hyun-Suk Min, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/629,141

(22) Filed: Jul. 28, 2003

(65) Prior Publication Data

US 2004/0181335 A1 Sep. 16, 2004

(30) Foreign Application Priority Data

Mar. 14, 2003 (KR) .................................. 10-2003-0016090

(51) Int. Cl.$^7$ .............................................. G01C 21/26
(52) U.S. Cl. .......................... 701/207; 701/25; 701/35; 701/207; 701/212; 701/213; 701/214; 342/357.01
(58) Field of Search .............................. 701/23, 25, 35, 701/200, 207, 208–209, 212–214, 300; 342/357.01, 357.06, 357.08

(56) References Cited

U.S. PATENT DOCUMENTS

| | | | |
|---|---|---|---|
| 4,903,211 A | * | 2/1990 | Ando ........................... 701/200 |
| 4,924,402 A | * | 5/1990 | Ando et al. .................. 701/208 |
| 5,523,765 A | * | 6/1996 | Ichikawa ..................... 342/451 |
| 5,864,771 A | * | 1/1999 | Yokoyama et al. ......... 701/208 |
| 5,995,023 A | | 11/1999 | Kreft |
| 2002/0128775 A1 | | 9/2002 | Brodie et al. |

FOREIGN PATENT DOCUMENTS

| | | |
|---|---|---|
| DE | 44 32 208 | 9/1994 |
| EP | 1 136 838 | 9/2001 |
| WO | WO 01/01370 | 1/2001 |

* cited by examiner

*Primary Examiner*—Gertrude A. Jeanglaude
(74) *Attorney, Agent, or Firm*—Dilworth & Barrese LLP

(57) ABSTRACT

A method and an apparatus for detecting location of a movable body in a navigation system comprising a map data detector for detecting map information of a region corresponding to location information from an external digital map storage on the basis of the location information of the movable body transmitted from sensors sensing the location and traveling information of the movable body; a memory for storing the map information detected from the map data detector; a filter for computing an optimum location of the movable body including road error included in the map information on the basis of the location and traveling information of the movable body transmitted from the sensors; and a map-matching unit for receiving the optimum location information of the movable body from the filter and correcting the optimum location information by matching the optimum location information and the map information stored in the memory. The method and apparatus can apply a constraint to the location of the movable body by computing the location of the movable body including a width of road, in comparison with a case using only direction of road as a measured value. Further, the method and apparatus increases accuracy of location determination of the movable body by performing real-time correction of the sensor information including error whenever the sensor information is inputted, using the constraint model including the map information.

11 Claims, 13 Drawing Sheets

(A)  (B)

APPARATUS FOR DETECTING LOCATION OF MOVABLE BODY IN NAVIGATION SYSTEM AND METHOD THEREOF

PRIORITY

This application claims priority to an application entitled "Apparatus For Detecting Location Of Movable Body In Navigation System And Method Thereof" filed in the Korean Industrial Property Office on Mar. 14, 2003 and assigned Serial No. 2003-16090, the contents of which are hereby incorporated by reference.

BACKGROUND OF THE INVENTION

1. Field of the Invention

The present invention relates to a navigation system, and more particularly to an apparatus and method for detecting a location of a movable body such as a car in navigation system.

2. Description of the Related Art

Typically, a car navigation system provides a driver with current location information of the car and an optimum route to destination and guides the driver according to a traveling route. The most basic function of the car navigation system is to accurately determine a current location of the car.

FIG. 1 is a schematic constructional view of a conventional navigation system, which mainly illustrates a construction necessary for measuring a current location of a car in a car navigation system. Referring to FIG. 1, a typical car navigation system includes a GPS sensor 10, a dead reckoning (DR) sensor 20, a map data storage 30, a current location detector 40 and a display 50.

The map data storage 30 stores a digital map. FIGS. 2a and 2b illustrate a conventional method of storing map data. Typically, for rapid search in map data, a total map is divided into a plurality of parts, known as "map sections", of a predetermined unit size, and road information is displayed by means of nodes and links in each of the map sections. FIG. 2a shows a map of South Korea, which is divided into 12 map sections, and FIG. 2b shows one of the 12 map sections, in which road information is displayed with nodes and links.

The GPS sensor 10 is a sensor for receiving a Global Positioning System (GPS) signal. In the present example, GPS implies a system for tracing a global location by means of 24 artificial satellites orbiting at a height of about 20,183 km. That is, GPS is a satellite navigation system in which a GPS receiver installed on an observational station receives the radio wave transmitted from a satellite, the accurate location of which is known, so that the time necessary in receiving a radio wave is calculated, thereby obtaining a location of the observational station. The GPS sensor 10 receives the GPS signal and transmits location information using geometric coordinates x, y, z, and current time information t of a car to the current location detector 40.

The DR sensor 20 is a sensor detecting its own relative location and moving direction by means of previous location information. Typically, the DR sensor may be divided into a sensor for measuring a distance traversed, for instance, speedometer, odometer, accelerometer, etc., and a sensor for measuring an angle of rotation, for instance, geomagnetic sensor, gyro, etc. Accordingly, the DR sensor 20 senses a velocity v and a moving direction θ of a car and transmits it to the current location detector 40.

The current location detector 40 extracts map data of a corresponding region, on the basis of location information of the car transmitted from the GPS sensor 10 and the DR sensor 20 and performs map-matching for location information of the car using map data. That is, the current location detector 40 indicates a location of a user on previously constructed map data, known as a "digital map", and confirms the location of the car with one point on the map. Further, as a result of the confirmation, the current location detector 40 computes location information of the car and displays the location information through a display 50.

In the present example, typically, since the GPS sensor 10 and the DR sensor 20 include an error in the measured value, the current location detector 40 performs map-matching to correct the error. For instance, the GPS sensor 10 may have errors such as ionization layer delay error, satellite clock error, multi-path and the DR sensor 20 may have an initial alignment error and a conversion factor error. Particularly, when the car passes high buildings, trees, tunnels, etc., the car may not sufficiently receive the GPS signal and thus the error becomes larger. Also, when the error is accumulated, it is difficult for the current location detector 40 to accurately determine the location of the car. When location information of the car measured using sensors, which have errors as described above, is indicated on a map, the location information does not agree with the actual location of the car. Accordingly, in order to correct errors, a typical current location detector 40 performs map-matching using a digital map.

FIG. 3 illustrates the current location detector 40, typically the current location detector 40 includes a sensor 41, a map data detector 42, a memory 43, a filter 44 and a map-matching unit 45. The sensor 41 receives sensor data, for example, x, y, z, t, v and θ, from the GPS sensor 10 and the DR sensor 20, and transmits the car location coordinate information x, y for detecting a map data from among the sensor data x, y, z, t, v and θ to the map data detector 42. The map data detector 42 extracts map data of a corresponding region from the map data storage 30 on the basis of the location information x, y and stores it in the memory 43.

The filter 44 receives location coordinates x, y, and time t, velocity v and angle θ of the car and computes an optimum location x', y' and angle θ' using the values as measured value of the filter. The filter 44 typically uses a GPS/DR integrated Kalman filter combining GPS and DR. Since the Kalman filter mathematically minimizes a measured error of a variable and has a characteristic of being suitable for computation and prediction of the variable, it is known as a prediction filter. Furthermore, the Kalman filter can predict the optimum state even under an error circumstances. Accordingly, the Kalman filter is typically used in order to minimize a measured error of a sensor in the car navigation system.

The characteristic of the Kalman filter, values x', y' and θ' computed by the filter 44 do not agree with an actual map line, owing to the error of the GPS sensor 10 and the DR sensor 20. The map-matching unit 45 performs map-matching using the values x', y' and θ' computed by the filter 44 and the digital map stored in the memory 43 in order to correct the error. That is, the map-matching unit 45 corrects the computed location by matching the values x', y' and θ' computed by the filter 44 on the digital map.

The filter 44 and feed back location coordinates $\delta_x$, $\delta_y$, velocity δv and an angle δθ information of the car outputted from the filter 44, in order to correct the error of the DR sensor 20 on the basis of GPS data, providing a relatively accurate location information in comparison with the DR sensor 20. Further, the filter 44 receives the location/angle of a car matched from the map-matching unit 45 and a difference in location and angle, that is, Δx, Δy and Δδ computed by the filter 44, and corrects the GPS/DR integrated Kalman filter in the filter 44.

A conventional method for detecting a current location of a car in a car navigation system is described with reference to FIG. 4a. When the location coordinate information x, y, z and time t of the car received by the GPS sensor and the velocity v and direction information θ of the car sensed by the DR sensor 20 (FIG. 1) are inputted in step S10, the car navigation system detects a region corresponding to the sensor data x, y, z, t, v and θ from the pre-stored digital map, as discussed with reference to FIGS. 2a and 2b, and stores it separately in memory 43 (FIG. 3 in step S20. In step S30 the car navigation system initializes the GPS/DR integrated Kalman filter model for computing the location information of the car using the sensor data, then the car navigation system computes the location information of the car using the sensor data as measured value of the GPS/DR integrated Kalman filter in step S40.

Typically the GPS sensor 10 (FIG. 1) and the DR sensor 20 (FIG. 1) include an error within the measured value, the location computed by the GPS/DR integrated Kalman filter model is not accurate owing to the error included in the GPS sensor 10 (FIG. 1) and the DR sensor 20 (FIG. 1). In order to solve this problem, the GPS sensor and the DR sensor correct the error of GPS sensor and the DR sensor by feedback data of the measured data in step S50. In this case, the data being fed back to the GPS/DR integrated Kalman filter 44 (FIG. 3) is the location coordinates δx, δy, velocity δv and angle δθ information of the car outputted from the GPS/DR integrated Kalman filter.

Further, in step S60, the location information computed in step S40 is map-matched using the digital map about region corresponding to the sensor data stored in step S20. In step S70, the GPS/DR integrated Kalman filter is corrected using the map-matching result. That is, the GPS/DR integrated Kalman filter is corrected using filter correction data Δx, Δy and Δθ generated by the map-matching result.

FIG. 4b illustrates a process flow of the map-matching step S60 (FIG. 4a). In step S61, link information and node information are detected from the map, which is an object of map-matching, that is, a digital map stored in step S20 (FIG. 4a). In step S62, it is judged whether the location computed in step S40 (FIG. 4a) on the basis of the link information and node information is a crossroads. In judging whether the computed location is a crossroads, an existence of a crossroad within a predetermined distance may be detected using a forward node information and link information. It can be determined that the computed location is a crossroads, when a trace of the car calculated from the GPS/DR integrated filter passes a node of the crossroads or when a measured attitude angle has a large difference from a direction angle of the current computed road, without regard to that the trace has not passed yet, or has already passed.

From the judgment in step S62, if the location computed in step S40 (FIG. 4a) is a crossroads, a link of an adjacent crossroads is selected in step S63. If not, a link of the shortest distance from the computed location is selected in step S64. In this case, the selected link becomes matched map information for the computed location information.

As described above, when the map-matching has been performed about the computed location information, x and y coordinate corresponding to the matched link are calculated in step S65. In step S66, a difference between the x and the y coordinate included in the computed location information and the x and the y coordinates calculated in step S65 are outputted as filter correction data. The filter correction data is a difference, Δx, Δy and Δθ, between a location/angle of the car matched in step S63, S64 and a location/angle computed in the filter 44. The error of the GPS/DR integrated Kalman filter is corrected using the outputted filter correction data in step S70 (FIG. 4a).

FIG. 5 shows an example of a method for correcting a location of a car by conventional method in a car navigation system, or in other words, correcting location information computed through the GPS/DR integrated filter by means of map-matching. Circles represent location information computed by the GPS/DR integrated filter and straight lines represent the matched location information.

First, a forced correction of the attitude angle and location of the car is implemented for general traveling. For instance, when it is judged that a car is traveling along a bridge, a tunnel, or a long, straight road, the attitude angle Δθ of the car is adjusted, since it can be said that the attitude angle of the map-matched car is corrected. As shown in FIG. 5a, since an error of 'Δy' is generated when the car is traveling on a horizontal road, the value 'y' computed in the GPS/DR integrated filter is corrected by the difference 'Δy'. Further, as shown in FIG. 5b, since an error of 'Δx' is generated when the car is traveling on vertical road, the value 'x' computed in the GPS/DR integrated filter is corrected by the difference 'Δx'. Also, as shown in FIG. 5c, when the car passes a crossroads, the location of the car is corrected to the intersection by the difference 'Δx and Δy'.

A conventional current location detection apparatus and method thereof using the aforementioned correction method for attitude angle, can not adjust an absolute location of a car and a forced correction method in the vertical and horizontal directions includes error and uncertainty. Further, the conventional current location detection apparatus and method thereof can perform a location correction only in limited cases, for instance, when the car continuously travels on straight line direction during a predetermined time or passes a crossroads. That is, since the conventional method can perform a sensor correction only in limited section, a real-time location correction in a car navigation system requiring constantly accurate location has been impossible. Accordingly, the current location detection apparatus and method thereof can not accurately detect a location of the car.

Further, in order to correct the error of the GPS sensor/DR sensor and compute the location information of a car, a typical centralized Kalman filter has been used in the prior art. In the present example, the centralized Kalman filter can most easily realize an optimum filter when the order of the equation used for implementing the system is low. However, when the order of the equation used for implementing the system is high, it is difficult for the centralized Kalman filter to calculate in real-time since the calculation load of an inverse matrix and covariance matrix increases. Further, when a sensor is out of order, the centralized Kalman filter can judge it to be out of order only after measured value taken from several sensors is processed. Accordingly, it is difficult for the conventional prior art to prevent an erroneous measured value from affecting a computed measured value for the location information of the car.

SUMMARY OF THE INVENTION

Accordingly, the present invention solves the above-mentioned problems occurring in the prior art, and it is an object of the present invention to provide a method and an apparatus for accurately detecting a location of a movable body in a car navigation system.

It is another object of the present invention to provide a method and an apparatus for detecting a location of a movable body, which can improve an accuracy of location determination of a movable body by means of prediction and real-time correction of sensor information using limitation filter whenever the sensor information including an error is inputted, after composing a linear model using a map information with the limitation filter.

It is a further object of the present invention to provide a method and an apparatus for detecting a location of a movable body, which can detect a location of a movable body including road error on the basis of a digital map.

It is yet another object of the present invention to provide a method and an apparatus for detecting a location of a movable body, which can improve an accuracy of a location determination of a movable body by means of distributed processing of error correction process of sensor for detecting a location of the movable body.

In order to accomplish these objects, according to the preferred embodiment of the present invention, there is provided an apparatus for detecting location of a movable body comprising: a map data detector for detecting a map information of region corresponding to a location information from external digital map storage on the basis of the location information of the movable body transmitted from sensors sensing the location and traveling information of the movable body; a memory for storing the map information detected from the map data detector; a filter for computing an optimum location of the movable body including road error included in the map information on the basis of the location and traveling information of the movable body transmitted from the sensors; and a map-matching unit for receiving the optimum location information of the movable body from the filter and correcting the optimum location information by matching the optimum location information and the map information stored in the memory.

In order to accomplish these objects, according to the preferred embodiment of the present invention, there is provided a method for detecting a location of a movable body comprising the steps of: 1) detecting and storing a map information corresponding to a location information in response to location and traveling information of a movable body received from sensors sensing a location and traveling information of the movable body, and initializing a GPS/DR filter model; 2) computing a first location information of the movable body on the basis of the GPS/DR filter model; 3) matching the first location information with the stored map information, and extracting a road linear information at which the movable body is located, on the basis of the first location information and the matched map information; 4) initializing a map constraint filter model on the basis of the traveling information of the movable body sensed by the sensors and the road linear information extracted in step (3); 5) computing a second location information of the movable body including an road error on the basis of the map-limited filter; 6) computing an optimum location information of the movable body on the basis of the first location information of the movable body computed in step (2) and the second location information of the movable body computed in step (5); 7) generating a filter correction data for correcting a state and an error of the GPS/DR filter model and the map constraint filter model on the basis of the computed result in step (6); and 8) correcting the state and error of the GPS/DR filter model and the map constraint filter model by means of the filter correction data.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, the preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
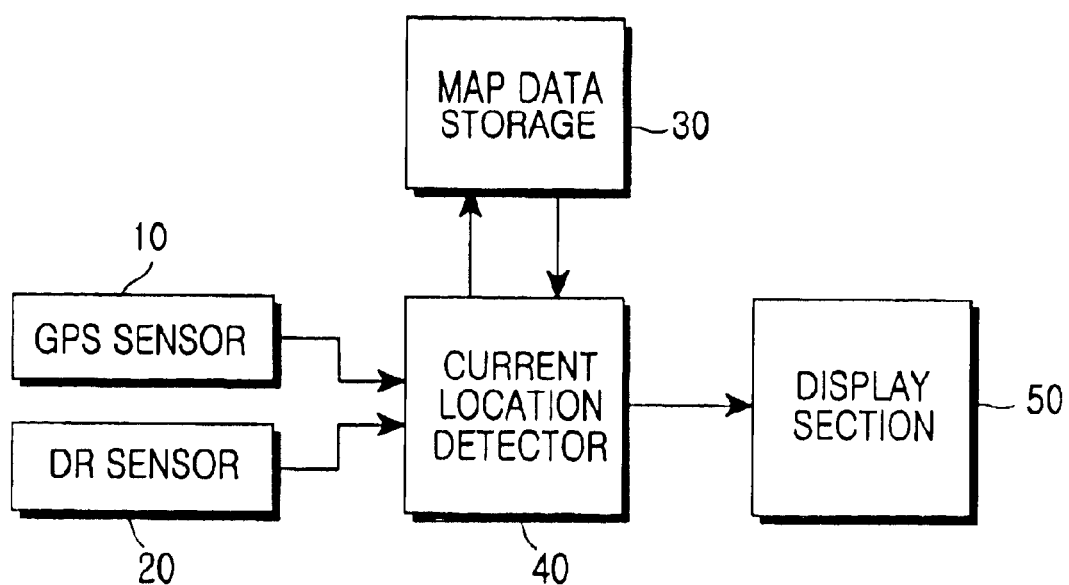
FIG. 1 is a block diagram showing an approximate construction of a conventional car navigation system.
Figure 2:
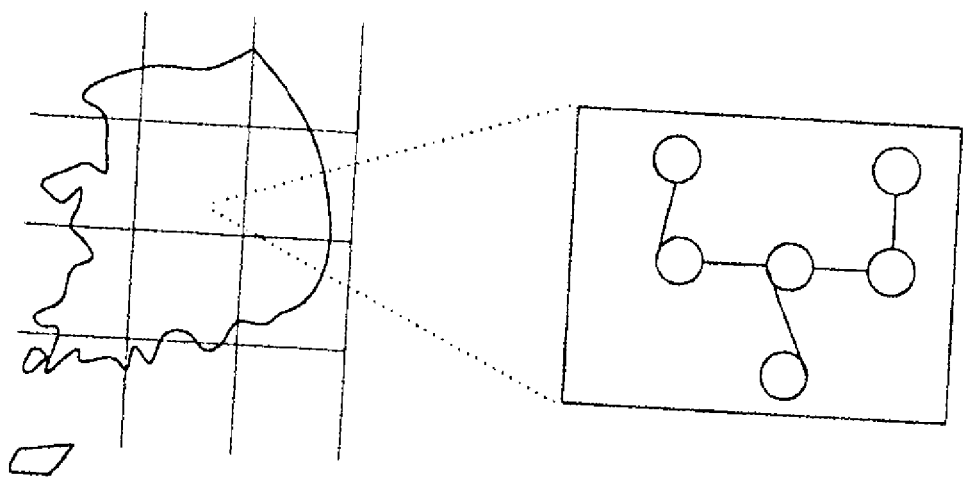
FIG. 2 is a block diagram illustrating a conventional storage method of map data.
Figure 3:
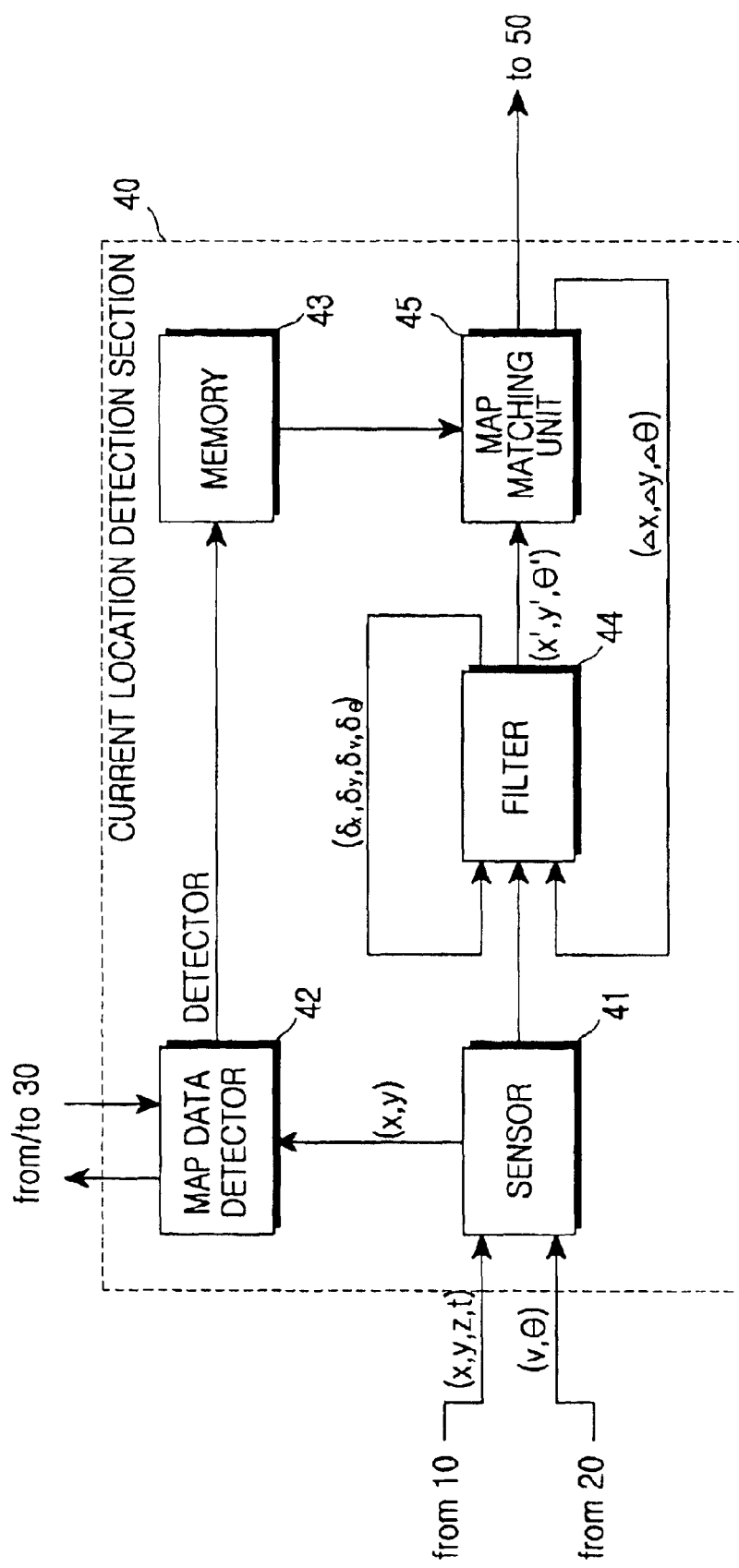
FIG. 3 is a schematic diagram for a conventional current location detector in a car navigation system.
Figure 4A:
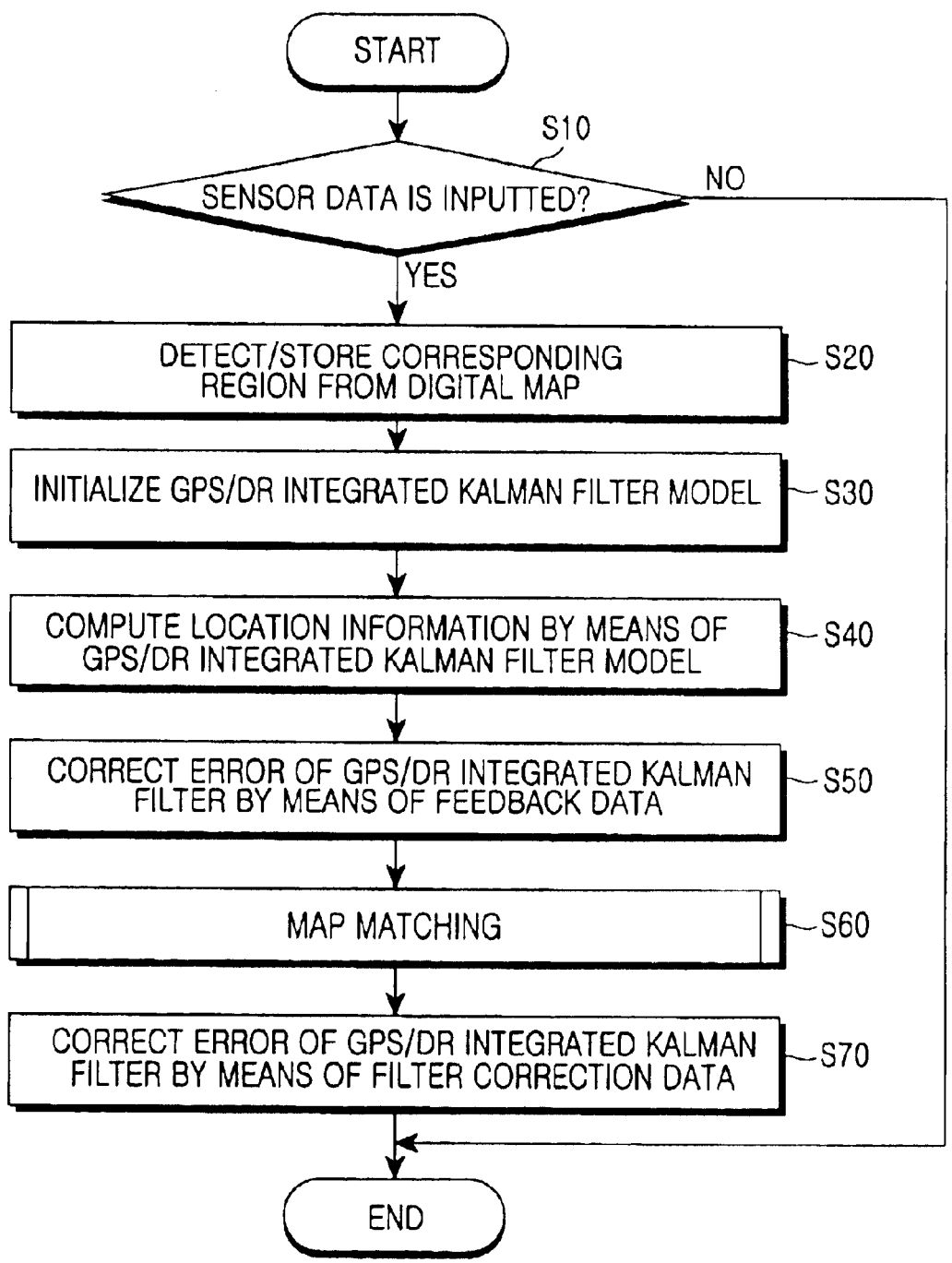
FIG. 4a is a flow chart of a conventional method for detecting a current location of a car in a car navigation system.
Figure 4B:
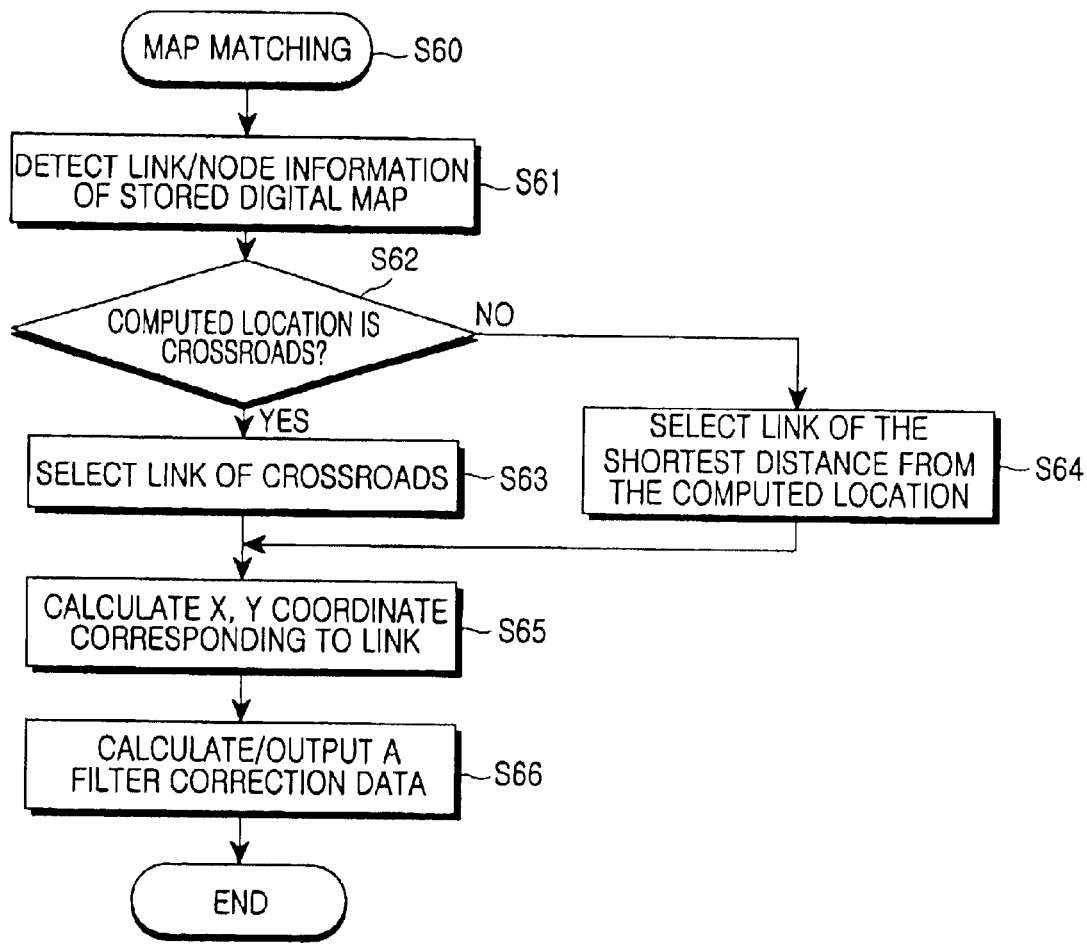
FIG. 4b is a flow chart of a conventional method for map matching used in a car navigation system.
Figure 5:
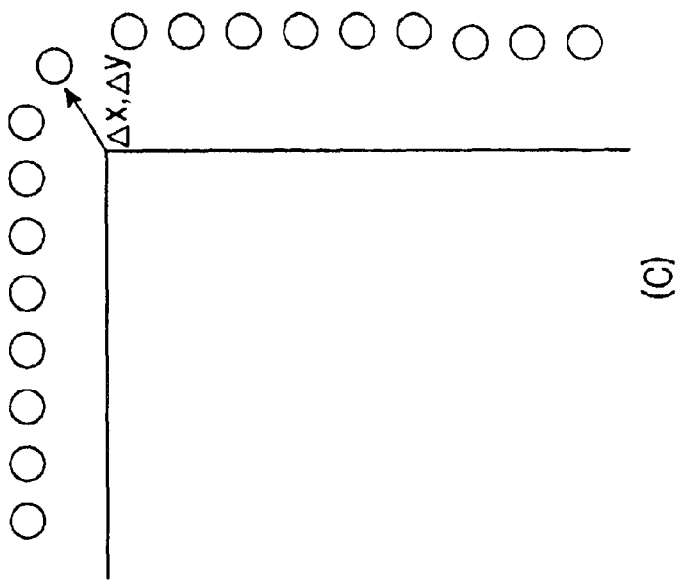
FIG. 5 is a diagram showing an example of a method for correcting a location of a car by the conventional method in a car navigation system
Figure 5:
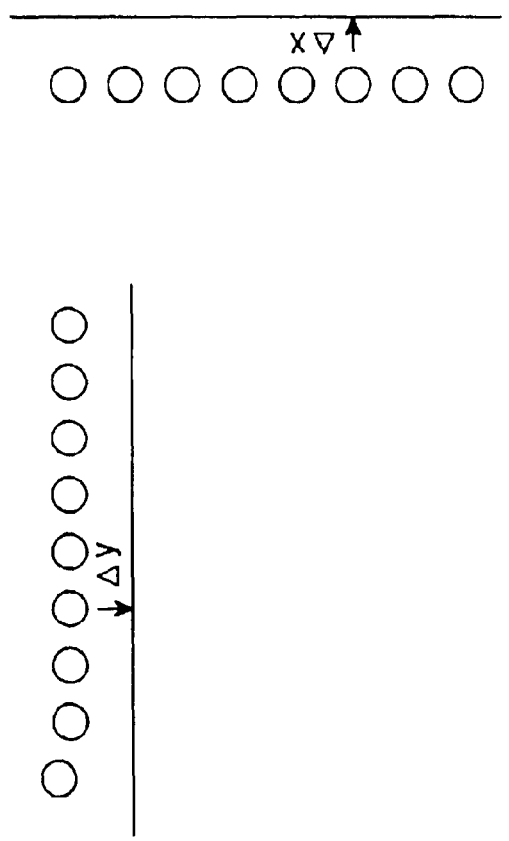
Figure 6:
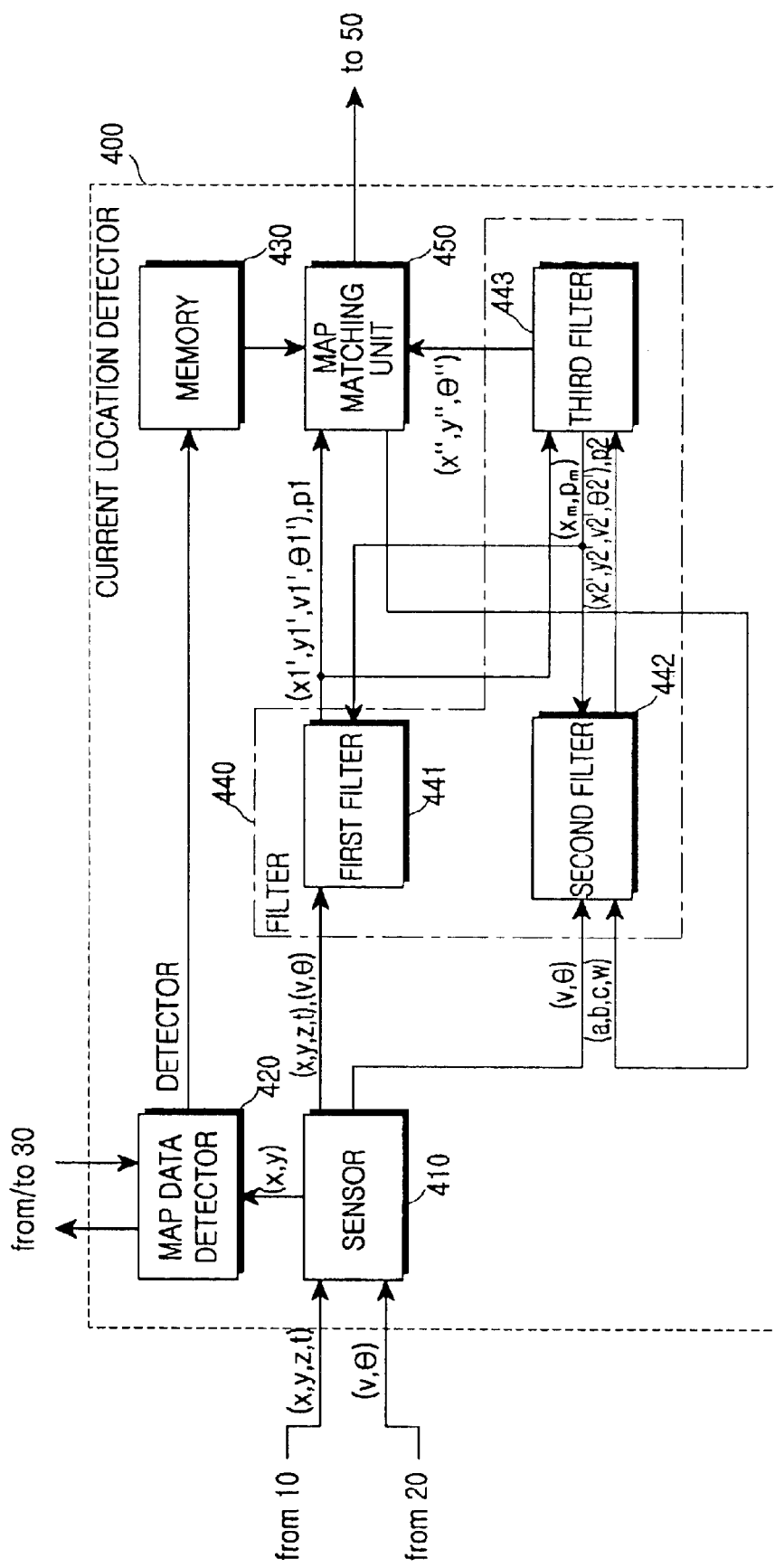
FIG. 6 is a schematic diagram of a location detector in a car navigation system according to an embodiment of the present invention.

FIG. 6 is a block diagram of a location detector 400 in a car navigation system according to one embodiment of the present invention, the location detector 400 comprises a sensor 410, a map data detector 420, a memory 430, a filter 440 and a map-matching unit 450. The sensor 410 receives sensor data, for example, coordinates x, y, z, time t, velocity v and angle θ from the GPS sensor 10 and the DR sensor 20, and transmits the location coordinates information x, y for detecting map data among the sensor data x, y, z, t, v and θ to the map data detector 420. The map data detector 420 extracts map data of the corresponding region from the map data storage 30 on the basis of the location coordinates information x, y and stores it in the memory 430.

The filter 440 receives a location coordinates x, y, time t, velocity v and angle θ of the car, and computes optimum location coordinates x", y" and angle θ" using the values as measured value. The filter 440 consists of a plurality of filters 441, 442, 443. The filter 440 consists of a distributed layer type Kalman filter, that is, a combined type Kalman filter. The filter 440 consists of a first filter 441, for example, a GPS/DR filter, for computing first location information of the car from the sensor data, a second filter 442, for example, a map-constraint filter, computing second location information of the car from linear information of the road transmitted from the map-matching unit 450, and a third filter 443, for instance, a master filter, which includes the first filter 441 and the second filter 442 integrated with each other.

The map-matching unit 450 matches the values x", y" and θ" computed in the filter 440 with the digital map in order to correct the computed location. Further, the map-matching unit 450 extracts road linear information including road error from the first location information of the car computed by the first filter 441 and transmits it to the second filter 442. Here, the road linear information including the road error means a width of the actual road on which the car is traveling.

Figure 7:
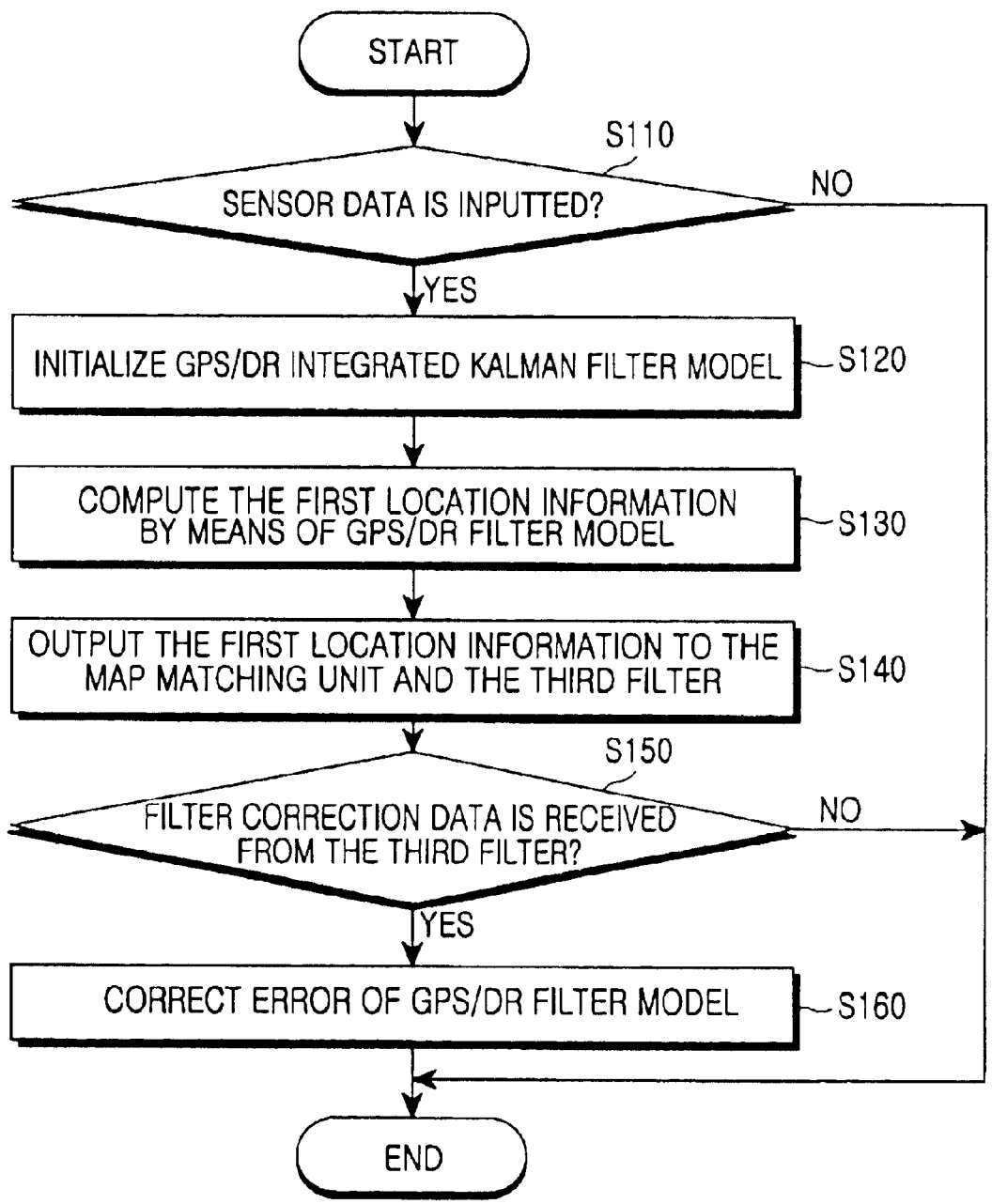
FIG. 7 is a flow chart illustrating an operation of a first filter included in a current location detector in a car navigation system according to an embodiment of the present invention.

FIG. 7 to FIG. 10 are flow charts illustrating operation of the first filter 441, the second filter 442, the third filter 443, and the map-matching unit 450. Referring to FIG. 6 and FIG. 7, the operation of the first filter 441 is described.

First, the first filter 441 receives sensor data, for example, location coordinates x, y, time t, velocity v and direction angle θ information of the car, from the sensor 410 in step S110, and initializes the GPS/DR filter model for computing the first location information of the car using the sensor date as measured value in step S120. The GPS/DR filter model initialized in step S120 is shown in Equation 1.

$$x_k = \phi_{k-1} x_{k-1} + w_{k-1}, \ w_k \sim N(0, Q_k)$$
$$Z_k = H_k x_k + v_k, \ v_k \sim N(0, G_k) \quad \text{[Equation 1]}$$

In Equation 1, x represents an equation of the state of the system (GPS/DR model) at time t, Ø represents the GPS/DR model, known as system, for computing location, W represents an error of the system model and $N(0, Q_k)$ represents a distribution $Q_k$ and average 0 of the system error. Z represents an equation of a measured model, H represents the measured model, v represents an error of the measured model, and $N(0, G_k)$ represents a distribution $Q_k$ and average 0 of the measured model error.

As described above, when the GPS/DR filter model is initialized, the first filter 441 applies the sensor data to the GPS/DR filter model of the Equation 1 in order to compute the first location information x1', y1' and θ1' of the car in step S130. In step S130, a method for computing the first location coordinate information x1', y1' and θ1' is shown in Equation 2.

$$x_k = \phi_{k-1} x_{k-1} \quad \text{[Equation 2]}$$

Referring to the Equation 2, the current state $x_k$ of t is computed by multiplying the previous state model $Ø_{k-1}$ by the previous state $x_{k-1}$.

Further, in step S140, the first filter 441 outputs the first location information x1', y1' and θ1' to the map-matching unit 450, and outputs the first location information x1', y1' and θ1', velocity information v1' and P1 to the third filter 443. Here, the P1 is an error of the first location information x1', y1' and θ1' outputted from the first filter 441.

The map-matching unit 450 extracts the road linear information using the first location coordinate information x1', y1' and θ1'. The method for extracting the road linear information in the map-matching unit 450 and detailed description of the road linear information will be described with reference to FIG. 10. Further, afterwards the third filter 443 generates filter correction data, that is, optimum state computation information $x_m$, error information $P_m$, using the information x1', y1', v1', θ1' and P1 inputted from the first filter 441 and a second location information x2', y2', and θ2', velocity information v2' and P2 inputted from the second filter 442. Then, the third filter 443 transmits it to the first filter 441. The method for generating the filter correction data, that is, optimum state computation information $x_m$, error information $P_m$, will be described with reference to FIG. 9.

When the first filter 441 receives the filter correction data, including optimum state computation information $x_m$, error information $P_m$, from the third filter 443, which is the master filter, in step S150, the first filter 441 corrects the error of the GPS/DR filter model on the basis of the filter correction data, that is, optimum state computation information $x_m$, error information $P_m$, in step S160. The error of the GPS/DR filter model is corrected by the third filter 443 of master filter, the correction equation used for the correction is illustrated in Equation 3.

$$\hat{x}_k(+) = \hat{x}_k(-) + K_k[z_k - H_k \hat{x}_k(-)]$$
$$P_k(+) = (I - KH) P_k(-) \quad \text{[Equation 3]}$$

Referring to the Equation 3, a gain K is obtained by using difference between the computed value x(-) computed in the first filter 441 and actual measured value $Z_k$. Further, the final error P(+) is obtained by using the first error P(-) and the gain K.

Equations 1 to 3 are typical equations used for predicting an optimum location and correcting an error using a Kalman filter; because the equations are known to those skilled in the art, more detailed description is omitted.

Figure 8A:
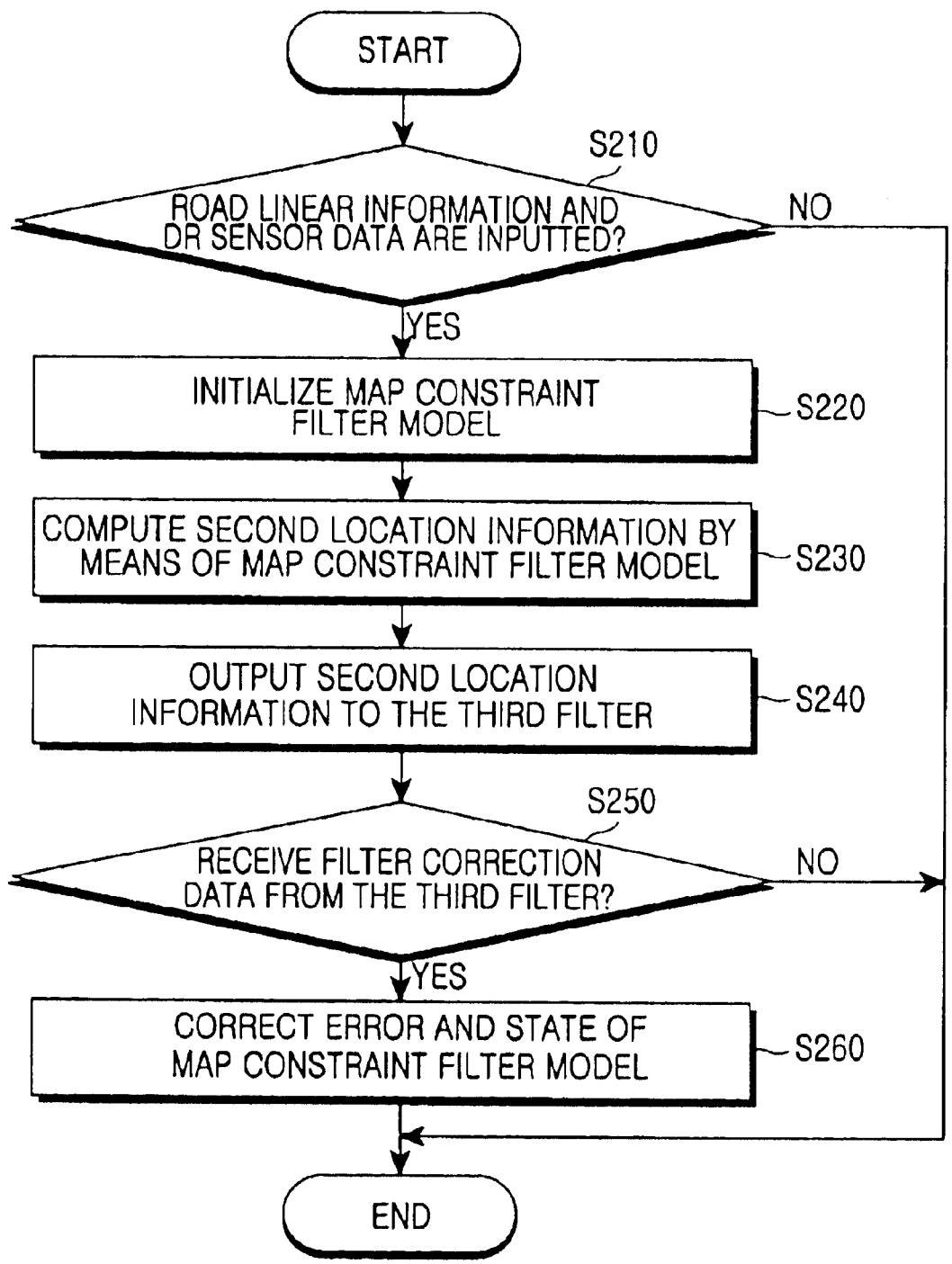
FIG. 8a is a flow chart illustrating an operation of a second filter included in a current location detector in a car navigation system according to an embodiment of the present invention.

Referring to FIG. 6 and FIG. 8a, an operation of the second filter 442 is described.

First, the second filter 442 receives DR sensor data, velocity v, and direction angle θ of the car, from the sensor 410 and receives road linear information from the map0-matching unit 450 in step S210. In step S220, the second filter 442 initializes a map constraint filter for computing the second location information using the DR sensor data and the road linear information as measured value.

When it is judged that the car is located on any road, information that can be obtained from the road is shown in the following Equation 4.

$$aX + bY = c \quad \text{[Equation 4]}$$

In Equation 4, when a road section regarded as straight line is indicated on Transverse Mercartor (TM) coordinate system, the a, b and c correspond to coefficients of linear expression, respectively. Since the surface of the earth is curved, projection is necessary in order to indicate the earth on a flat surface like a map or screen. Here, a coordinate system obtained by TM projection of one kind of projective methods is called TM coordinate system. In the TM projection, three-dimensional coordinates are converted into two-dimensional coordinate by projecting the three-dimensional coordinates on an earth ellipsoid onto a cylinder, which surrounds the earth ellipsoid in such a manner that the cylinder extends in a transverse direction and is tangent to a reference point of the earth ellipsoid. The TM projection can conserve a size of angle, which is one of the most important conditions among general conditions of map projection, and its theory is general. Accordingly, a road map data used in a car navigation coordinate system typically applies the TM coordinate system obtained by TM projection.

The map-matching unit 450 extracts such a coefficient of linear expression, for instance, a, b, c, and outputs it to the second filter 442. Here, the coefficient of linear expression comes under the road linear information. The second filter 442 initialize the map constraint filter model using a, b, c. Here, the initialized map constraint filter model is shown in the following Equation 5.

$$\begin{aligned} z_m &= c - (aX_{DR} + bY_{DR}) + v_m \\ &= (aX + bY) - (aX_{DR} + bY_{DR}) + v_m \\ &= a\delta X + b\delta Y + v_m \\ &= [a \ b \ 0 \ 0 \ 0 \ 0]x + v_m \\ &= H_m x + v_m \end{aligned}$$ [Equation 5]

The Equation 5 is an equation calculating a measured model using a difference between the linear information C calculated in road model and actual sensor input $X_{DR}, Y_{DR}$, and Equation 5 calculates as much as the difference between the road model and input value of the DR sensor.

In Equation 5, $v_m$ represents an error of the road information and physically represents that a car is located at any position within a range of the width of the road from the center line of the road. Further, the $v_m$ should be computed as a white noise, and the size of the $v_m$ should be a value relating to the width of the road for using Kalman filter. As described above, the present invention more accurately computes the location of the car by using the map constraint filter including the error of the road information.

Figure 8B:
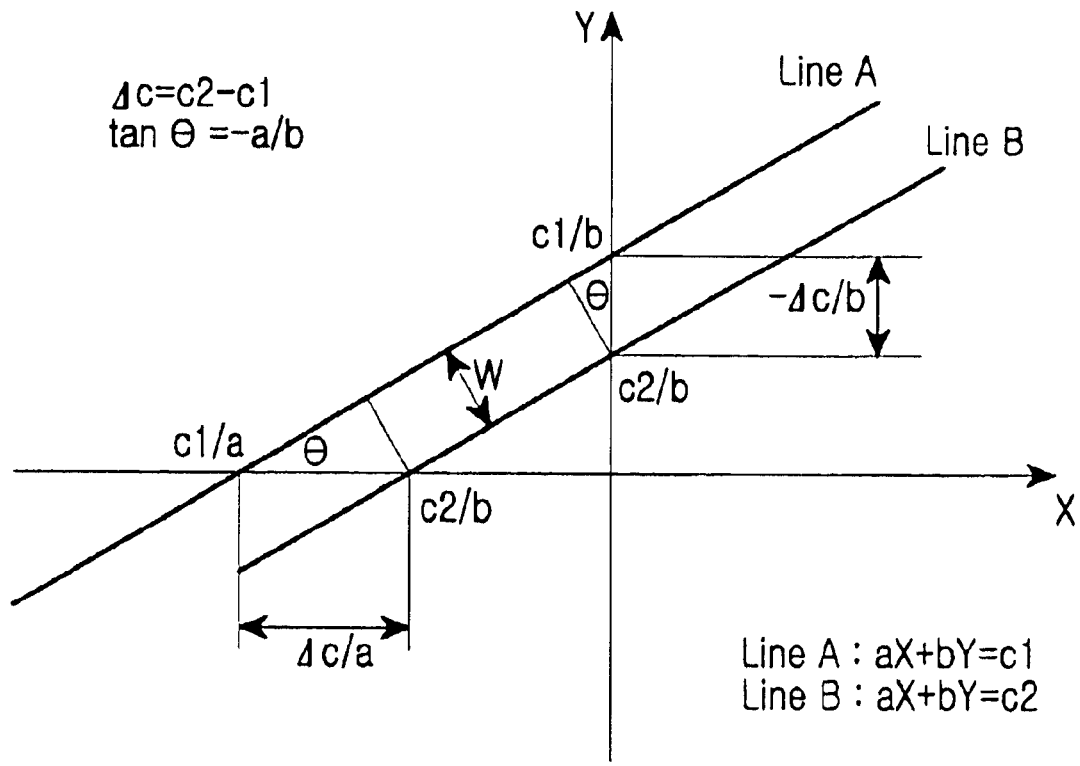
FIG. 8b is a graph showing a relationship between an error($v_m$) of map information and a width of a road.
Figure 9:
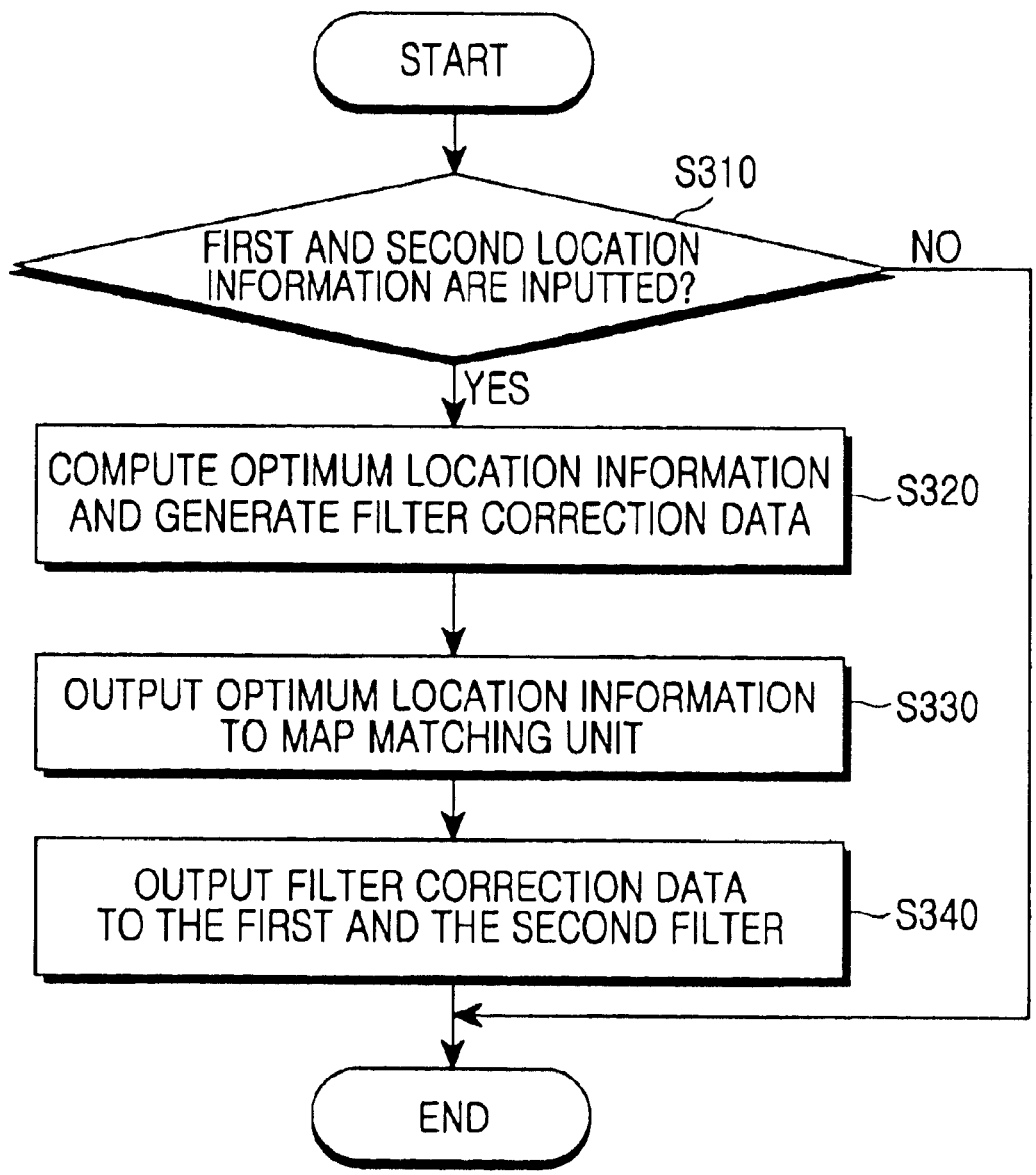
FIG. 9 is a flow chart illustrating an operation of a third filter included in a current location detector in a car navigation system according to an embodiment of the present invention.
Figure 10:
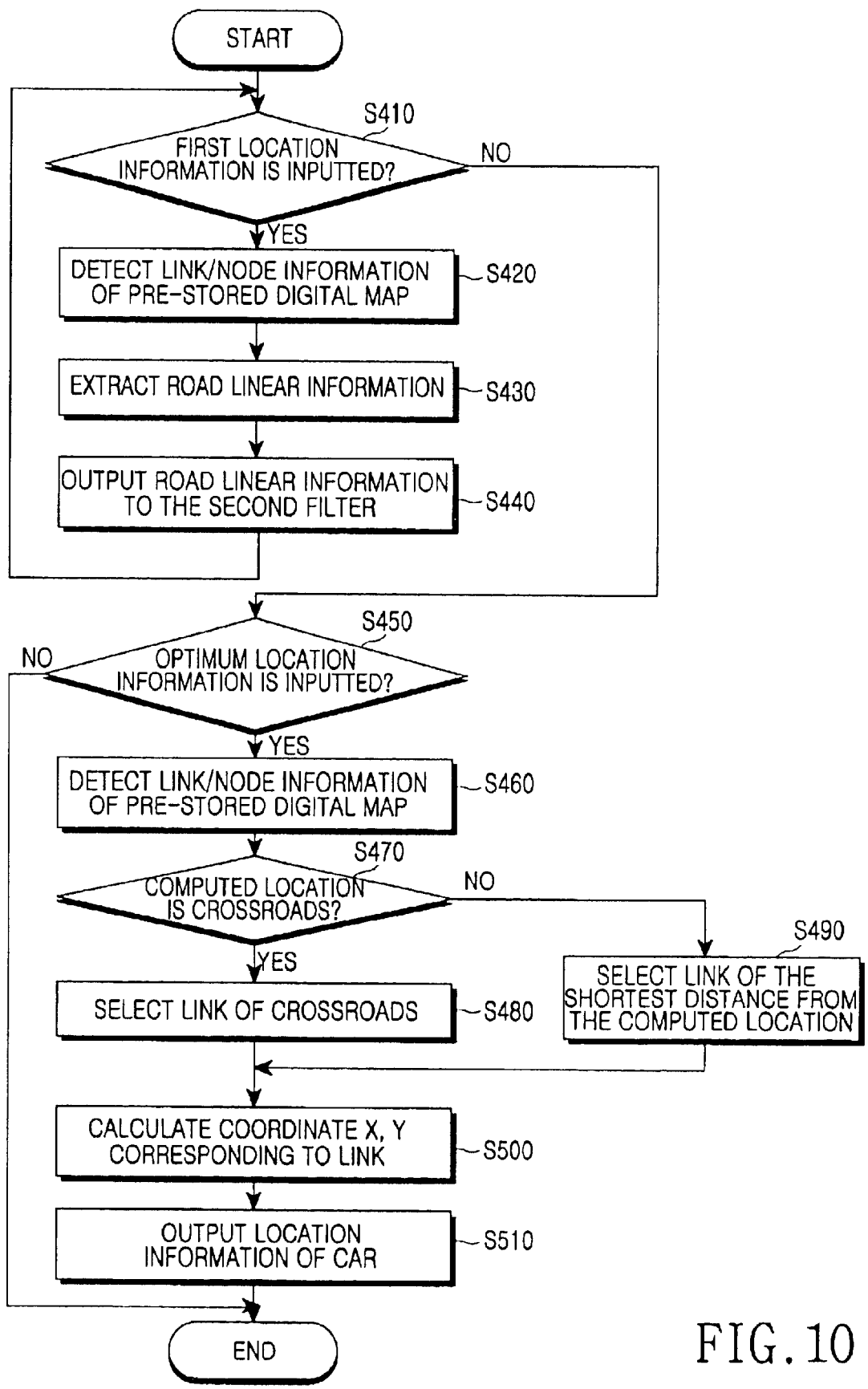
FIG. 10 is a flow chart of an operation of map-matching unit included in a current location detector in a car navigation system according to an embodiment of the present invention.

FIG. 8*b* is a two dimensional line graph showing a relation between the error $v_m$ of the map information and the width of road, the fluctuation band of the value c for determining the width of road as shown in the Equation 4 is shown in the following Equation 6.

$$\Delta c = W \frac{a}{\sin\theta} = -W \frac{b}{\cos\theta}$$ [Equation 6]

Further, when Δc includes a relation between a, b of an coefficient of straight line and angle θ, and a singular value of the sine function and cosine function, the Δc is shown in Equation 7.

$$\Delta c = W\sqrt{a^2+b^2}$$ [Equation 7]

The $v_m$ representing the error of the map information is computed as the white noise having gauss distribution as shown in Equation 8.

$$v_m \sim N(0, R_m)$$ [Equation 8]

In Equation 8, the $R_m$ is shown in the following Equation 9.

$$R_m = W^2(a^2+b^2)$$ [Equation 9]

Accordingly, when the road information is used in an actual navigation system, the coefficients a and b may be represented as components of direction cosine of a vector since an equation of a straight line is calculated as a relational expression between two points on a road. In this case, the Equation 9 may be modified as the following Equation 10.

$$R_m = W^2$$ [Equation 10]

The width of road $W^2$ obtained by using the Equations 6 to 10 is applied to an error in the measured model obtained by using the road linear model and DR sensor input. That is, the second filter 442 of the map constraint filter computes the location information of the car by considering the width of the road $W^2$ as error.

As described above, when the map constraint filter is initialized, the second filter 442 applies the DR sensor data and the road linear information to the map constraint filter of the Equation 4 in order to compute the second location coordinates information x2', y2', θ2' and velocity v2' in step S230 of FIG. 8*a*. Equation 2 shows an example of the method for computing the second location information x2', y2', θ2' in step S230.

The second filter 442 outputs the second location coordinates information x2', y2', θ2', velocity v2' and P2 in step S240 (FIG. 8*a*) to the third filter 443. In this case, the P2 is an error in regard to the second location coordinates information x2', y2' and θ2' outputted from the second filter 442.

The third filter 443 generates the filter correction data, that is, optimum state computation information $x_m$, error information $P_m$, using the first location coordinates information x1', y1' and θ1', velocity information v1' and P1 previously inputted from the first filter 441 and the coordinates information x2', y2', v2', θ2' and P2 inputted from the second filter 442. Then, the third filter 443 transmits the filter correction data to the second filter 442. A method for generating the filter correction data, that is, optimum state computation information $x_m$, error information $P_m$, will be described below with reference to FIG. 9.

When the filter correction data, such as, optimum state computation information $x_m$, error information $P_m$, is received in step S250 (FIG. 8*a*), the second filter 442 corrects the error of the map constraint filter on the basis of the filter correction data in step S260 (FIG. 8*a*). A correction equation for correcting the error of the map constraint filter in step S260 (FIG. 8*a*) is shown in the Equation 3.

Referring to FIGS. 6 to 9, the operation of the third filter 443 is performed as follows. The third filter 443 receives the first location coordinates information of the car from the first filter 441 and the second location information of the car from the second filter 442 in step S310. In step S320, the third filter 443 computes final optimum location coordinates information x'', y'' and θ'' using the first location information and the second location coordinates information, and generates the filter correction data, that is, optimum state computation information $x_m$=x'', y'' and θ'', error information $P_m$.

A method for generating the filter correction data, such as, optimum state computation information $x_m$, error information $P_m$, in step S320 is shown in the following Equation 11.

$$P_m = [P_1^{-1} + P_2^{-1} + \bullet\bullet\bullet + P_N^{-1}]^{-1}$$

$$\hat{x}_m = P_m[P_1^{-1}\hat{x}_1 + P_2^{-1}\hat{x}_2 + \bullet\bullet\bullet + P_N^{-1}\hat{x}_N]$$ [Equation 11]

Because two subfilters, the first filter 441 and the second filter 442, have been used instead of the master filter, i.e., the third filter 443, the value of 'N' is two in the Equation 11. Referring to the Equation 11, the filter correction data, such as, optimum state computation information $x_m$, error information $P_m$, is generated using the computed location coordinates information $x_1$, $x_2$ and the errors P1, P2 inputted from the first filter 441 and the second filter 442.

The third filter 443 outputs the optimum location coordinates information x", y" and θ" to the map matching unit 450 in step S330. Further, the third filter 443 outputs the filter correction data, such as optimum state computation information $x_m$, error information $P_m$, to the first filter 441 and the second filter 442 in step S340. Then, the first filter 441 and the second filter 442 correct the error of each filter using the filter correction data, such as, optimum state computation information $x_m$, error information $P_m$.

The map matching unit 450 has two functions. First, the map matching unit 450 extracts the road linear information including road error in response to the first location information x1', y1' and θ1' of the car transmitted from the first filter 441 and transmits the road linear information to the second filter 442. Second, the map matching unit 450 performs map-matching in response to the optimum location information x", y" and θ" of the car transmitted from the third filter 443. The latter is similar to the function of a conventional map matching unit.

Referring to FIG. 6 to FIG. 10, the operation of the map matching unit 450 is as follows. First, the first location information x1', y1' and θ1' is transmitted from the first filter 441 in step S410. Then, the map matching unit 450 detects link information and node information of the digital map previously stored in the memory 430 in step S420 and extracts the road linear information on the basis of link information and node information in step S430.

For instance, when it is judged that the car is located on some road, information, which may be obtained from the road is shown in the following Equation 12.

$$aX+bY=c \quad \text{[Equation 12]}$$

In Equation 12, parameters a, b and c correspond to the coefficient of linear expression respectively when a road section regarded as straight line is indicated on the TM coordinate system. The map matching unit 450 extracts the coefficients of the linear expression such as a, b and c and outputs them to the second filter 442 in step S440.

Also, the optimum location coordinates information x", y" and θ" is transmitted from the second filter 443 in step S450. Then, the map matching unit 450 detects the link information and node information of digital map stored already in the memory 430 in step S460. In step S470, it is judged whether the location inputted in step S450 on the basis of the link information and node information is a crossroads or not. In judging whether the computed location is a crossroads or not, an existence of a crossroad within a predetermined distance may be detected using a forward node information and link information. Also, it can be determined that the computed location is a crossroads when a trace of the car calculated from the GPS/DR integrated filter passes a node of the crossroads or when a measured attitude angle has a large difference from a direction angle of the current computed road, without regard to the fact that the trace has not passed yet, or has already passed.

From the judgment in step S470, if the location computed in step S450 is a crossroads, a link of an adjacent crossroads is selected in step S480. If not, a link of the shortest distance from the computed location is selected in step S490. In this case, the selected link becomes matched map information about the computed location coordinates information.

As described above, when the map-matching has been performed about the computed location coordinates information, x and y coordinate corresponding to the matched link are calculated in step S500. Then, the map matching unit 450 outputs the location information so that the location information of the car can be indicated at a corresponding location in step S510.

Figure 11:
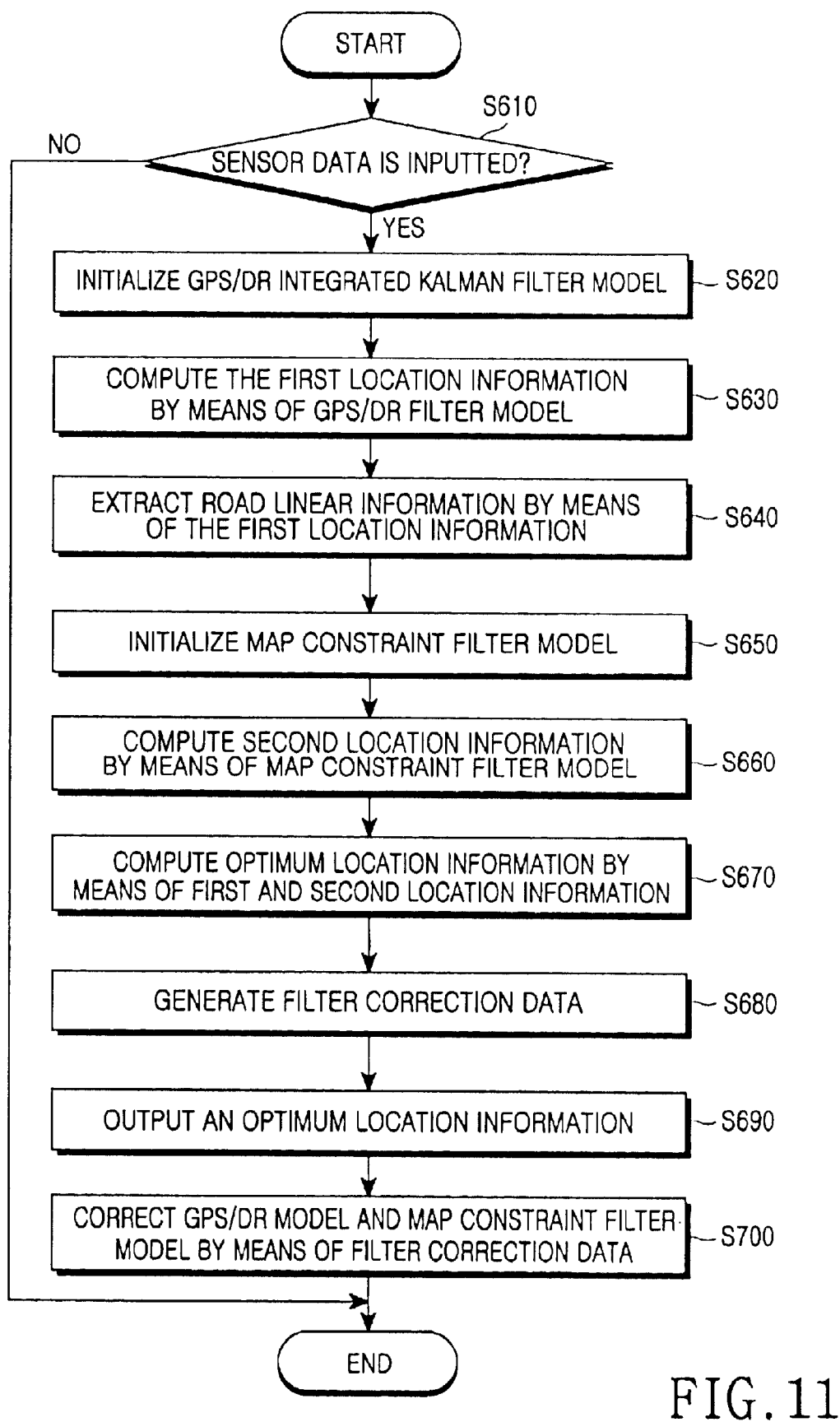
FIG. 11 is a flow chart of a method for detecting location of a car according to an embodiment of the present invention in a car navigation system.

The method for detecting location of a car illustrated in FIGS. 6 to 10 is incorporated in FIG. 11. FIG. 11 is a flow chart illustrating a method for detecting a location of the car in a car navigation system according to an embodiment of the present invention. Referring to FIG. 11, the sensor data including location coordinates information and direction information of the car is inputted from sensors installed on the car navigation system in step S610. Then, the car navigation system initializes the GPS/DR filter model to compute the first location information from the sensor data in step S620, and computes the first location information by means of the GPS/DR filter model in step S630. The GPS/DR filter model initialized in step S620 is shown in Equation 1. Further, a method for computing the first location information of the car by means of the GPS/DR filter model is as shown in Equation 2.

As described above, when the first location information of the car is computed, the car navigation system extracts the road linear information by means of the first location information in step S640. Here, the extracted road linear information represents coefficients of linear expression shown in Equation 4.

The car navigation system initializes the map constraint filter model on the basis of the extracted road linear information in step S650, and computes the second location information by means of the map constraint filter model in step S660. In this case, the map constraint filter model initialized in step S650 is shown in Equation 5. Further, a method for computing the second location information of the car by means of such a map constraint filter model is shown in Equation 2.

As described above, when the first and the second location information of the car are computed, the car navigation system computes the optimum location information of the car by means of the first and the second location information in step S670. Further, the car navigation system generates the filter correction data for correcting the GPS/DR filter model and the map constraint filter model in step S680. In this case, a method for generating the filter data is shown in Equation 11.

Further, in order to determine final location information of the car, the optimum location information of the car computed in step S670 is transmitted to the map matching unit in step S690. And, in step S700, the GPS/DR filter model and the map constraint filter model are corrected using filter correction data generated in step S680.

As described above, the present invention can apply a constraint to location of the car by computing the location of the car including a width of road after applying the map constraint filter to the second filter in comparison with a case using only the direction of road as a measured value. Further, the present invention can increase accuracy of location determination for the car by performing real-time correction of sensor information including an error whenever the sensor information is inputted, using the constraint model including the map information. Further, the present invention can provide more actual location information in that the error component included in the measured value has a physical meaning related to the actual width of road. Accordingly, the present invention can provide more accurate information to a driver in the car navigation system providing driver with a guidance message on the basis of current location information of the car.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for detecting location of a movable body in a navigation system, the apparatus comprising:
   a map data detector for detecting a width of a road, road linear information, and map information of a region corresponding to a location information in an external digital map storage on the basis of location information of the movable body, said location information being transmitted by sensors sensing location coordinates and traveling direction information of the movable body;
   a memory for storing said width of the road, road linear information, and map information detected from the map data detector;
   a filter for computing an optimum location information of the movable body including the width of a road and the road linear information included in said map information on the basis of the location coordinates and traveling direction information of the movable body transmitted by said sensors; and
   a map-matching unit for receiving the optimum location information of the movable body from the filter and correcting the optimum location information by matching the optimum location information and the map information stored in the memory.

2. The apparatus as claimed in claim 1, wherein the map data detector receives said location information of the movable body from a GPS sensor receiving a GPS signal, and detects said map information of region corresponding to said location information.

3. The apparatus as claimed in claim 1, wherein the filter comprises:
   a first filter for receiving said location information of the movable body from the GPS sensor receiving the GPS signal, computing a first location information of the movable body after receiving the traveling direction information, including a velocity and a traveling direction of the movable body from an inertia sensor and transmitting the computed first location information to the map-matching unit;
   a second filter for receiving the road linear information about said map information matched with said first location information, computing a second location information of the movable body including road error after receiving the traveling direction information, including said velocity and said traveling direction of the movable body from the inertia sensor; and
   a third filter for receiving said first location information of the movable body from the first filter and said second location information of the movable body from the second filter, computing said optimum location information of the movable body, and transmitting said optimum location information to the map-matching unit.

4. The apparatus as claimed in claim 3, wherein the first filter is a global positioning satellite/dead reckoning (GPS/DR) integrated Kalman filter.

5. The apparatus as claimed in claim 3, wherein the second filter is a map constraint filter.

6. The apparatus as claimed in claim 3, wherein the third filter generates filter correction data of the first and second filters on the basis of a computed result of said optimum location information and outputs said filter correction data to the first and the second filter.

7. The apparatus as claimed in claim 6, wherein the filter correction data includes an optimum state computation information and error information of a filter.

8. The apparatus as claimed in claim 1, wherein the map-matching unit
   matches first location information with road information stored in the memory after receiving said first location information of the movable body from a first filter,
   extracts the road linear information for where the movable body is located on the basis of said first location information and said matched map information,
   transmits said road linear information to a second filter,
   matches said optimum location information and said road information stored in the memory after receiving said optimum location information of the movable body from a third filter, and
   corrects said optimum location information.

9. The apparatus as claimed in claim 3, wherein the map-matching unit
   matches said first location information with road information stored in the memory after receiving said first location information of the movable body from the first filter,
   extracts the road linear information for where the movable body is located on the basis of said first location information and said matched map information,
   transmits said road linear information to the second filter,
   matches said optimum location information and said road information stored in the memory after receiving said optimum location information of the movable body from the third filter, and
   corrects said optimum location information.

10. A method for detecting a location of a movable body in a navigation system, the method comprising the steps of:
   1) detecting and storing map information corresponding to location information in response to location coordinates and traveling direction information of the movable body transmitted by sensors sensing a location coordinates and traveling direction information of the movable body, and initializing a GPS/DR filter model;
   2) computing first location information of the movable body on the basis of the GPS/DR filter model;
   3) matching said first location information with said stored map information and extracting road linear information for where the movable body is located on the basis of said first location information and said matched map information;
   4) initializing a map constraint filter model on the basis of said traveling direction information of the movable body sensed by said sensors and said road linear information extracted in step (3);
   5) computing second location information of the movable body including a road error on the basis of a map-limited filter;
   6) computing optimum location information of the movable body on the basis of said first location information of the movable body computed in step (2) and said second location information of the movable body computed in step (5);
   7) generating filter correction data for correcting a state and an error of the GPS/DR filter model and the map constraint filter model on the basis of said computed optimum location information; and
   8) correcting the state and error of the GPS/DR filter model and the map constraint filter model by means of said filter correction data.

11. The method as claimed in claim 10, wherein said filter correction data generated in step (7) includes optimum state computation information and error information of the GPS/DR filter model and the map constraint filter model.

* * * * *